United States Patent
Lo et al.

[11] Patent Number: 6,031,818
[45] Date of Patent: Feb. 29, 2000

[54] ERROR CORRECTION SYSTEM FOR PACKET SWITCHING NETWORKS

[75] Inventors: W. Steven Lo, Aberdeen; Krishnan Padmanabhan, New Providence, both of N.J.

[73] Assignee: Lucent Technologies Inc., Murray Hill, N.J.

[21] Appl. No.: 08/820,514

[22] Filed: Mar. 19, 1997

[51] Int. Cl.[7] .................. H04L 1/12; H04L 1/16

[52] U.S. Cl. .................. 370/216; 370/390; 370/394; 709/203; 714/748

[58] Field of Search .................. 370/216, 390, 370/432, 217, 218, 242, 250, 389, 394, 400, 401; 709/201, 203, 220, 227, 228; 714/748, 749

[56] References Cited

U.S. PATENT DOCUMENTS

| | | | |
|---|---|---|---|
| 4,439,859 | 3/1984 | Donnan | 371/32 |
| 4,807,224 | 2/1989 | Naron et al. | 370/218 |
| 5,410,536 | 4/1995 | Shah et al. | 370/216 |
| 5,459,725 | 10/1995 | Bodner et al. | 370/390 |
| 5,515,508 | 5/1996 | Pettus et al. | 395/200.33 |

Primary Examiner—Alpus H. Hsu

[57] ABSTRACT

A system for correcting errors in the transmission of data packets between a source and a receiver. The source sends data packets to the client unit and server unit. The system uses the client unit and the server unit to send a repaired packet stream to a receiver when an error is detected. The client unit detects errors in the packet stream and sends retransmission requests of the lost data packets to the server unit. The server unit retransmits the lost data packet to the client unit, which then corrects the packet stream by inserting the lost packet into the proper time order and transmitting the repaired packet stream to the receiver.

25 Claims, 5 Drawing Sheets

ERROR CORRECTION SYSTEM FOR PACKET SWITCHING NETWORKS

FIELD OF THE INVENTION

This invention relates to the field of packet switching networks, and more particularly to a system for correcting errors in the network.

BACKGROUND OF THE INVENTION

The Internet Multicast Backbone ("MBone"), is a virtual network on the Internet, which has been in existence beginning as a research tool since the early 1990s. In the last few years, this same network has become more widely used as the medium for large scale live video broadcasts and their distribution to Internet subscribers. Additionally, Internet phone applications for PC platforms have spurred a tremendous increase in traffic and interest in the Internet for audio and video telephone applications.

It is a widely held belief that this medium has great potential for use by corporate Intranets as well as by private users. However, a major drawback with this medium is that groups of transmission signals, called packets, which in combination comprise the entire signal, are frequently lost by the medium, seriously degrading the video picture and sound quality, and making the medium currently unacceptable for expanding business applications.

To resolve this degradation problem, for example, in data applications, sophisticated retransmission based error recovery schemes have been previously proposed. However, unlike data transmissions which require 100% reliability in signal transmission, systems on the Internet can operate in virtual time allowing for signal error detection and correction without signal loss. One recent proposal for solving degradation in real-time multimedia transmission modifies the source and receiver applications to conform to a new protocol which then incorporates the retransmission of packets in the new protocol. Assembly and disassembly of video frames is done as part of the protocol. However, no request for retransmission is sent out if the current round trip delay is greater than an inter-frame period, which is assumed to be constant in this scheme. A major disadvantage is that the system requires frame level information and requires modification to the internal workings of the specific applications being used.

Accordingly, there is a need to provide a system and method which can retransmit lost packets without requiring any modifications of existing applications, sources and receivers.

SUMMARY OF THE INVENTION

In accordance with the present invention, a system and method is provided which, upon the detection of a lost packet, requests the retransmission of the lost packet, inserts the correct packet where it belongs in a packet stream and transmits a repaired packet stream to the receiver. One exemplary embodiment of the present invention system uses client and server units, which can be connected in a variety of configurations to detect and repair packet losses and thereby result in improved communications between a source and receiver.

In the invention, a packet stream is transported from a source to a client unit, which in turn forwards the packet stream to an associated destination. The client unit receives a packet stream from the source which, normally, the client unit forwards to one or more receivers. However if the client unit detects an error in the packet stream, the client unit will instead, after correction, send a repaired packet stream to those receivers. The receiver applications at the intended destinations will accept this repaired packet stream from the client unit, rather than the original packet stream sent from the source, since the repaired packet streams containing the audio and video information have fewer losses than the original transmission. Advantageously, the client unit detects the error or lost packets, corrects the error by requesting a retransmission of the lost packets from the server unit rather than the source. The client then inserts a copy of the lost packet into the proper time order to form the repaired packet stream. As such, the system permits high quality video and audio communications between the source and receiver. In one exemplary embodiment, the system is versatile enough to be used in a variety of applications ranging from video telephony, two person video and audio telephony, to distributive video programming on the Internet and corporate Intranets.

The client and server units work independently from one another and are decoupled from the internal workings of the source and receiver applications. Accordingly, the present invention works solely at the packet level and does not require any frame level information. As such, the present invention is easily and immediately deployable in existing telecommunication systems, such as those which support Internet and corporate Intranet communications.

BRIEF DESCRIPTION OF THE DRAWINGS

A more complete understanding of the present invention may be obtained from consideration of the following description in conjunction with the drawings in which:

FIGS. 4 (a) and 4(b) show graphs which depict the improvements achieved in packet loss rates in an embodiment in accordance with the present invention;

DETAILED DESCRIPTION

A system and method is provided which minimizes the effects of packet losses by requesting retransmission of lost packets upon their detection. The system uses a client unit and a server unit to detect an error or lost data packet, request retransmission of the lost data packet and send a repaired packet stream to the receiver, thereby providing high quality video and audio communication between the source and the receiver. The units are versatile enough to be used in a variety of applications ranging from video telephony to distributive video programming and can be used in any packet communication networks. In addition, since the present invention client and server units do not require any modifications to the existing sources and receivers (e.g., those existing on the Internet), they can be incorporated immediately with the receivers thereby obtaining a higher quality transmission from a client unit located in close proximity to the receiver. In contrast to prior art systems, the client-server retransmission strategy is decoupled from the internal workings of the applications, and works solely at the packet level. In addition, at least one retransmission request is always sent out for a missing packet, and the playback buffer size and delay naturally grow to reflect the current network conditions.

In general, the receiver applications contemplated for use with the present invention listen to the client unit for their video and audio transmission, which is a repaired packet stream with much fewer packet losses than the original transmission. The client unit can accomplish this by obtaining missing packets from the server unit as soon as the missing packets are detected. The characteristics of the transmission (interactive conversation or distributive programming) determine how much delay can be tolerated and the subsequent extent of the repair. It is noted and demonstrated below, that the perceptual tolerance limit of a few hundred milliseconds delay on interactive communication permits a significant amount of repair and improvement in packet reception. For distributive programming, such as seminars, much higher delays can be tolerated, leading to near-perfect reception at the receivers.

Figure 1:
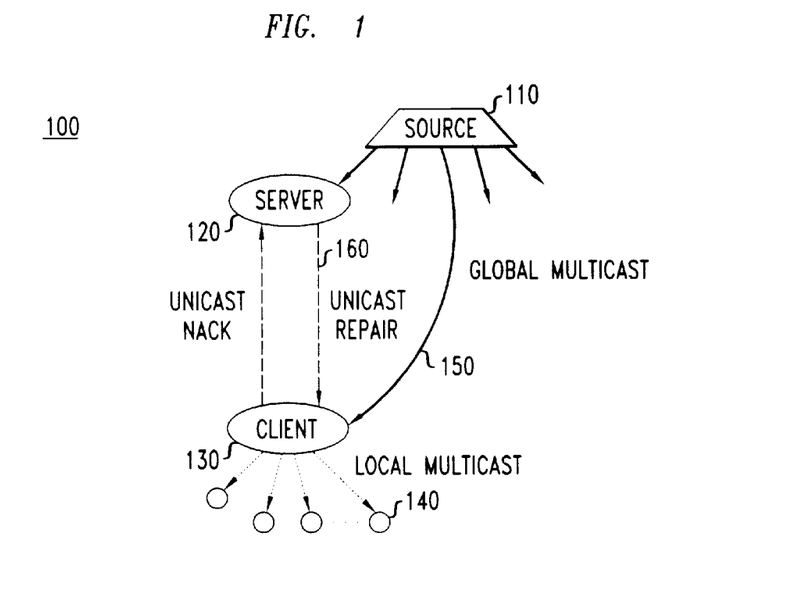
FIG. 1 shows an illustrative embodiment of the present invention.

Referring to FIG. 1, there is shown an exemplary configuration of a telecommunications system 100 which incorporates the client and server units of the present invention. System 100 consists of a multimedia source 110 at a first location, which multicasts the packets out to several destination locations, including a server unit 120 and a client unit 130. Client unit 130 also receives packets from server unit 120. As a result, receivers 140 at the destination locations may receive in a subsequent multicast from client unit 130, an original packet stream 150 or a repaired packet stream 160. As a result, a packet stream received utilizing the present invention has much fewer losses than the original packet stream 150 if the original packet stream is faulty. The instant configuration adds an evaluation capability to system 100, to determine the improvement in video and audio reception quality for viewers at the destination locations.

The client and server units 130, 120 operate on packet streams in the Real time Transport Protocol ("RTP") format (encapsulated in the User Datagram Protocol ("UDP")). UDP is a transport layer connectionless mode protocol providing a datagram mode of communication for delivery of packets to a remote or a local user. RTP, a draft Internet standard, is an end-to-end application level protocol for real time data, such as audio or video, in multicast or unicast modes. Many of the real time multimedia applications on the Internet are based on RTP and the present system will work with any such application. An important feature of the RTP packet format for the purposes of the present invention is the incorporation of a 16-bit sequence number field in the packet header. This field is used by each client unit and server unit 130, 120 to detect lost or out of-order packet arrivals, as well as to store and retrieve packets in the playback and retransmit buffers present in the client and server units 130, 120, respectively. RTP packets can be of variable length (determined by the application), and typically one UDP packet encapsulates one RTP packet.

In addition to the data delivery protocol, RTP also consists of a Real time Transport Control Protocol ("RTCP") control packet which handles control information to monitor the quality of service and provides participant information on a session. RTCP packets are not sequence number equipped, are typically limited to a small fraction of the bandwidth for a session, and the loss of individual RTCP packets does not affect the audio or video output. Accordingly, the present system does not attempt to compensate for lost RTCP packets.

Figure 2:
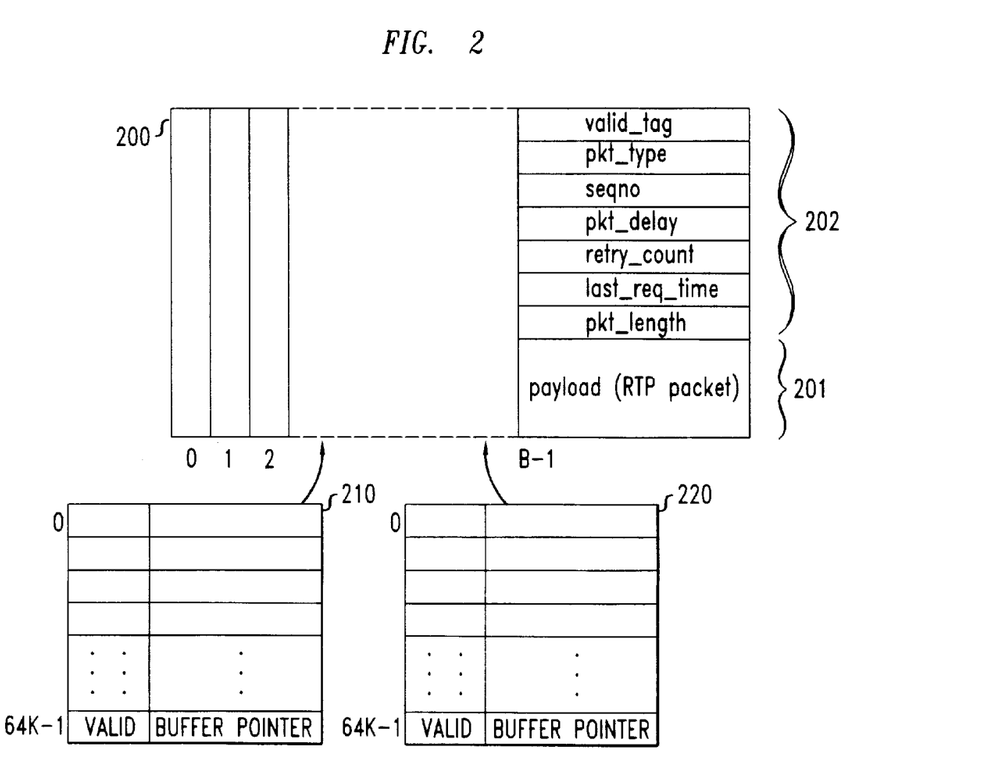
FIG. 2 shows an exemplary embodiment of a playback buffer in accordance with the present invention.

Client units 130 act as a front end to one or more audio and video applications. Client units will listen to up to two transmission sources 110, typically one for audio and one for video (unicast or multicast). Client unit 130 also repairs any gaps in the packet stream by communicating with a specified retransmission server unit (unicast), and supply the repaired data streams to one or more audio/video applications (unicast or multicast). Referring to FIG. 2, an exemplary structure of a playback buffer 200 used by the client unit is shown, which can be implemented using various memory devices, shift registers and other commercially available devices. Playback buffer 200 provides storage for packets arriving while a lost packet is being retrieved by retransmission. Two associated tables 210 and 220, one each for audio and video packets, keep track of pending retransmission requests and the associated empty slots in playback buffer 200. As above, audio table 210 and video table 220 may be implemented using software, standard hardware devices, or combinations thereof.

In the shown embodiment of FIG. 2, playback buffer 200 is a circular buffer having a sufficient number of memory locations to store up to $\beta$ packets, where each packet consists of a payload field as well as several header fields, where $\beta > 1$. The payload field 201, when filled, contains an entire RTP or RTCP packet, and the different header fields 202 indicate the state of the packet as described below. The active part of the buffer is demarcated by top-of-queue (toq) and bottom-of-queue (boq) pointers, and it is only the slots in this active region that are of concern in the present invention. A valid_tag indicates whether the slot has a packet or a "hole" corresponding to a lost and as yet unretried packet. The field pkt_type indicates the nature of the packet. In the present system, pkt_type could be video data, audio data or control packets. All packet types (only two of which may be present) are serialized through the buffer to preserve their arrival sequence, before being written out to the associated UDP ports. The field seqno is the RTP sequence number of the audio or video packet In the case of a hole this corresponds to the sequence number of the missing packet.

The field pkt_delay specifies the time delay between the current packet and previous packet in the buffer. This timing information is necessary since many video applications do not implement a playback point algorithm, and render frames on the display as soon as an end-of-frame packet arrives. For these applications, if the packets are supplied out of the buffer as they become available, there will be a freeze-frame at each lost point (while waiting for the retransmission) followed by a fast-forward action as the packets buffered behind the hole are sent to the application in a burst. Since a goal of the system is to avoid any frame level manipulations, thus making it easily implementable, the system only preserves the inter-packet times of the packets while playing them out to the application. Experimental results, as detailed below, indicate that the motion quality rendered by this timing is virtually indistinguishable from that when the application directly receives the source packets.

The field retry_count records the number of retransmission requests that have been sent out for a lost packet. The system permits up to a retry_limit number of retransmission requests to be sent out before the system times out the lost packet. The field last_req_time records the time when the last retransmission request for a lost packet was sent out. This field is used to determine when to send out another request for the lost packet, if necessary. Finally, the field pkt_length specifies the length of the payload, which contains the RTh or RTCP packet.

The size of the playback buffer, $\beta$, is the maximum number of packets that need to be stored, and is determined mainly by the maximum playback delay. As will be described, the size of the active part of this buffer will vary based on the client-server round trip delays, and should often be much less than $\beta$. Burstiness in the traffic will also cause the size of the buffer to increase and decrease. For example, utilizing vic, an application for transmitting packet video, operating at 128 Kbps (the default rate), the interpacket time is about 65 ms if the packet size is around 1024 bytes (the default setting for the maximum transmission unit). If $\beta=4096$, the system is able to store about 4 minutes worth of packets, which is not only orders of magnitude greater than a cross country round trip delay (about a few hundred ms), but is also about the maximum acceptable delay for a distributive video program. For a 1 Mbps video transmissions over a corporate Intranet, for example, this reduces to about 30 seconds worth of buffering. For a 71 Kbps audio session in the default pcm2 mode of the Visual Audio Tool application, the interpacket time is about 40 ms, and a 4K buffer size will provide up to 2.5 minutes of delay. The maximum playback buffer size is a parameter in the system, with a default value of 4K packets.

As indicated, video table 220 and audio table 210, are maintained by the client unit for fast access to information about outstanding retransmission requests. They comprise, for example, of 64K entries, one per sequence number. Each entry indicates if a retransmission request is pending for that sequence number, as well as the location of the corresponding hole in playback buffer 200. When the retransmitted copy does arrive, it can be stored in the proper location with a single lookup to one of these tables.

Functionally, the client unit operates by repeatedly servicing input ports (from the network) and output ports (to the audio/video applications), updating playback buffer 200 in the process. An exemplary pseudo code of the system functions is shown in Appendix A. As would be understood, alternative embodiments accomplishing the same are possible in view of the present invention. For instance, the client unit's functionality is described as two processes, an input and an output process, although other representations are possible.

With respect to the embodiment of FIG. 1 and in conjunction with Appendix A, the input_process polls, for example, in a round robin fashion the ports associated with the video source, the audio source, and the retransmission server unit. RTCP control packets are directly inserted into the end of the buffer with the appropriate playback delay. As mentioned above, such processing applies only to incoming data packets and not control packets.

If a missing packet is received (determined by checking video table 220 and audio table 210), the function receive_copy is called, and the entry voided in either video table 220 or audio table 210. This can be the original packet arriving out of order or a retransmitted copy from the server unit. Note that a round trip moving average, avg_rt, can be updated only if this copy corresponds to the last retransmission request sent out for this packet. As shown below, the moving average has a significant effect on system performance.

If the sequence number of the incoming packet, in_seqno, is not in either video table 220 or audio table 210, then the gap between in_seqno and curr_seqno (the value of the current sequence number) is determined. If this value, loss_cnt, is less than a parameter loss_limit (the maximum value for the gap size), then the function receive_orig is called. This function sends out loss_cnt retransmission requests to the server unit, and inserts the incoming packet into playback buffer 200 at the location (boq+loss_cnt+1) mod $\beta$, marking the intermediate locations as holes. That is, an error has been detected in the packet stream, where each hole represents a lost or missing packet. Inter-packet delay is interpolated uniformly, if loss_cnt is non-zero. If the gap in sequence numbers is greater than loss_limit, no attempt is made to recover the packet loss burst. The default value for loss_limit is 50 packets.

The output_process has two major functions. The first is to send out additional retransmission requests (up to a limit of retry_limit) for holes (slots corresponding to lost and as yet unretrieved packets) that may exist in the playback buffer. The retransmission request is an important function in the client unit in terms of the computational overhead, the retransmission packet overhead, and the effective loss rate seen by the receiver, all of which would be desirable to minimize simultaneously. An exemplary system maintains a moving average, avg_rt, of the client-server round trip times for the last $\kappa$ matching retransmitted copies, and uses a multiple (T) of that as a threshold to determine when to send the next request for each hole in the buffer. Note that round trip times can only be computed from last_req_time if the copy that comes back corresponds to the last request sent out and not an earlier one. The function retry_request accomplishes this for each hole in the system, and is called when a timer expires with the threshold for the earliest outstanding request All of the parameters involved in this system—the moving average distance for avg_rt, the round trip delay multiple used to compute the threshold, and the retry_limit are user definable. Default values for these parameters, for example, are 2 retransmit requests, threshold T=2×avg_rt, and a moving average distance of 15. For the instant exemplary configuration, the initial value of avg_rt is set to 100 ms for the Intranet environment. The effect of some of these parameters on the efficiency of the client unit operation are discussed below.

The second function of the output_process is to send packets to the audio and video applications in the correct time sequence. The pkt_delay field (shown in FIG. 2) of the top of the buffer is used to determine when to send the packet out relative to the previous packet, where a packet is sent by calling a function output_packet. If the toq slot is empty, and retry_limit retransmission requests have been sent out without response, then that packet is ignored and the next packet is processed at the appropriate time.

Note that in the system of the present invention, the playback buffer builds up naturally to account for round trip times to the server unit, as a result of the first few retransmission requests. The system does not delay sending out the first packet from the buffer, to force the queue to grow. If the burstiness is ignored in the packet arrivals, the buffer will build up to a size of about (max(retry_count) +1)×T×avg_rt/mean inter-packet time), where max(retry_count) is the maximum number of retransmission requests that have been made for a missing packet. If any missing packet could not be retrieved from the server unit, this maximum value will be retry_limit.

Figure 3:
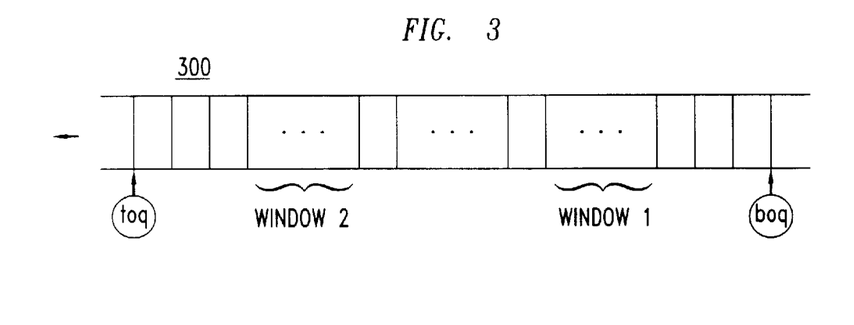
FIG. 3 shows an alternative embodiment of a playback buffer.

Referring to FIG. 3, an alternate retransmission request and time-out scheme is illustrated which is based on buffer windows and buffer length rather than round trip times. In this arrangement, no last req_time or retry_count fields need to be maintained in the buffer slots. Basically, if the top of buffer is empty, the system times out when the buffer length reaches a threshold. Similarly, to decide if another request needs to be sent out for missing packets, the system scans non-overlapping windows in the buffer, starting from the bottom. The idea in both cases is that the number of packets behind a hole is an indication of the time spent waiting since the last retransmission request. Thus, window I starts n packets from the bottom to allow sufficient time for the first retransmission request to come back. Similarly, window 2 is spaced sufficiently away from window I to allow time for the second request to come back. This scheme works very well if the packets arrive uniformly or at least nearly so. However, studies indicate that even if the packets are generated uniformly at the source, their arrival can be quite bursty even after a couple of hops to different switching nodes. In this scenario, buffer growth is not a good predictor of elapsed time, and so a large fraction of the multiple retransmission requests are generated too early and all but the first copy discarded. As such, the former method is preferred.

Regardless of which of the above schemes is implemented, a retransmission request from the client unit to the server unit needs to identify two parameters: the source number (audio or video, e.g., —0 or 1), and the sequence number of the packet. In addition, the retransmission request number also needs to be a part of the request, so that the server unit can append the retransmission request number to the copy of the packet that is sent to the client. The client unit in turn can use the retransmission request number to determine if a copy matches the last request the client unit sent out and whether the received packet can be used to update the average round trip time. The retransmission requests have the same format as RTP messages, with the missing sequence number in the sequence number field of the RTP packet, and the source number and retransmission request number encoded in the payload type ("PT") field. The requesting client unit address is inserted in the SSRC field.

Copies retransmitted from the server unit to the client unit consist of the requested RTP packet with an added field in front containing the source number and the retransmission number. Once this field is extracted, the rest of the packet is identical to what the client unit would have received from the video or audio port. Since client units could be instantiated dynamically when the first retransmission request arrives from a client unit, the server unit sets up a socket for it and updates its client unit list. If the server unit cannot handle any more client units, it responds with all 1's, for example, in the added field. The client unit will then try another server unit at that point, if one exists. Since a single retransmission server unit services both audio and video packets in this configuration, a single UDP port can be used for communication between the server unit and the client unit.

As discussed, the server unit listens to up to two unicast or multicast sources for audio and video, stores the last M incoming packets from each source in a separate buffer and responds (by unicast or multicast) to requests (unicast) from one or more client units for retransmissions. Only RTP data packets are stored and retransmitted, and the server unit ignores RTCP control packets. Since RTP has a 16 bit sequence number field, at most 64K packets need to be stored for each source. However, following the previous discussion of the playback buffer architecture, a 4K packet buffer provides about 4 minutes of video storage at 128 kbps, and is the default retransmit buffer size in the present invention system.

Unlike the client unit's playback buffer, no circular buffer is needed for the server unit because the buffer will be read from random locations based on the client unit requests. As such, packets are stored and retrieved from the location given by their sequence number modulo M, an extremely fast and simple process when M is a power of 2, which is critical to being able to service more than just a few client units. Here, the assumption is that the client unit and server unit will not be off by more than M packets. In fact, this asynchrony between the two is a user-defined parameter in the present invention system—if a request is off by more than out_of_sync (<=M) packets, it will be ignored. The default value for this parameter is 512 packets.

For multicast sessions with multiple client units, the server unit maintains a list of client units that are currently active. This list is added to when new client units make their first request for a missing packet. The address of the client unit is retrieved from the SSRC field of the retransmission request, and if retransmissions are being transmitted in a unicast mode, a UDP socket is opened for that client unit address.

Figure 4A:
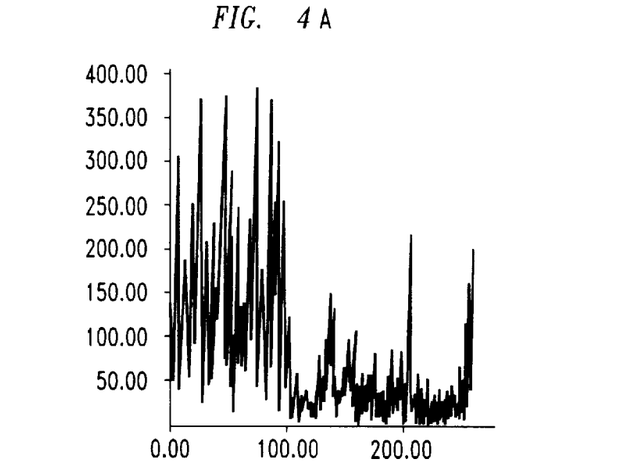
Figure 4B:
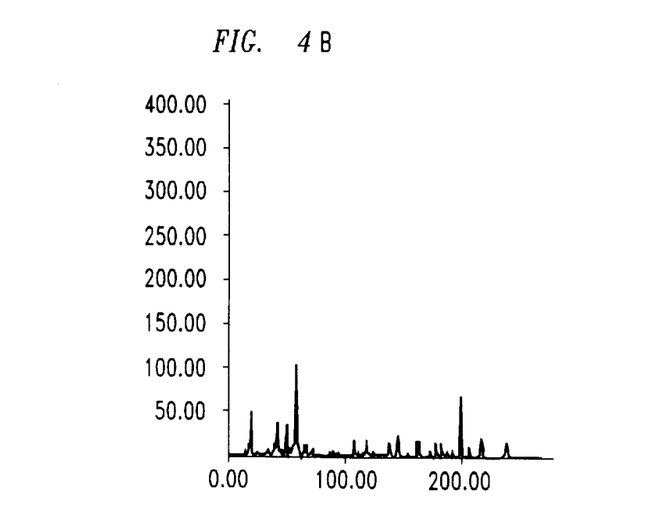

The present invention client/server architecture was employed for Mbone video (384 Kbps) and audio (64 Kbps) transmissions between two test site locations, one at Indian Hill ("IH"), Ill., and the other at Murray Hill ("MH"), N.J. A live weekly program was originated at Indian Hill, with the main goal for implementation of the present invention being to improve the reception for viewers in Murray Hill, who often encountered packet losses that average 6–15% over a 60 minute session, with short term losses as high a 30–40%. The network represents an implementation of what is termed a hub and spoke configuration, with one hub and one spoke. Most of the viewers at Murray Hill are on a single physical net, and in this case the exemplary configuration shown in FIG. 1 is a natural and very efficient mechanism for compensating for losses on the IH–MH link. A server unit is located on the same net as the source at IH, and a single client unit located at Murray Hill receives the original transmissions from the source. The client unit repairs the audio and video packet streams by requesting unicast retransmissions from the server unit. The client unit then multicasts the repaired stream on a different address with a very small time-to-live field. Viewers in Murray Hill tune in to this second multicast address to receive the high quality repaired audio and video programs. FIG. 4(a) and FIG. 4(b) are graphs which illustrate the effectiveness of this arrangement over one session. The graphs show the number of losses per thousand packets seen by a receiver over 20 minutes, for the original transmission (FIG. 4(a)) and for the present architecture (FIG. 4(b)). The data reveals that a maximum of two retransmission requests are sent out for a lost packet, though most of the lost packets are retrieved by just one retransmission requests. A more detailed analysis of the efficiency of this architecture is discussed below.

Figure 5A:
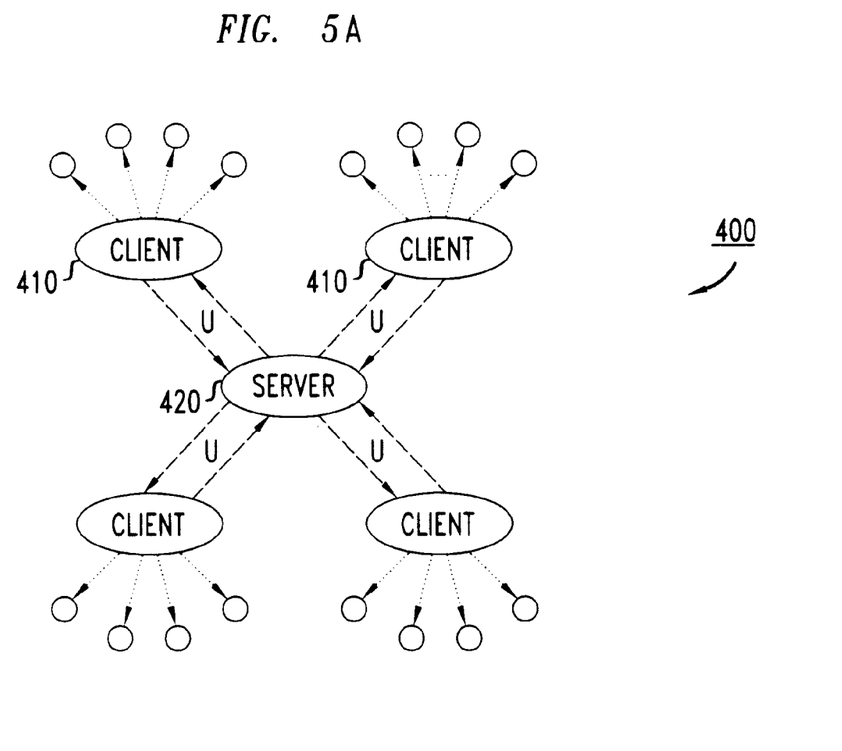
FIGS. 5(a) and 5(b) depict alternate configurations in which the present invention can be deployed.

The present invention architecture also extends to a multi-spoke configuration 400 as shown in FIG. 5(a), which is limited only by the number of client units 410 that a single server unit 420 can handle. The exemplary server unit implementation is capable of handling approximately ten client units, which translates to a few hundred viewers in a well balanced system. The configuration would seem quite reasonable in a corporate Intranet environment, with a small number of client units (one or two at each site) and many hosts served by each client unit. An important issue here is the second multicast address that each client unit uses to broadcast the repaired stream to its subset of listeners. If the time-to-live fields of this local multicast (say 1 or 2) are small enough that the multicast trees from two client units will not overlap, then all the client units can use the same address for this purpose, and the entire high quality multicast can be achieved with just two addresses.

Figure 5B:
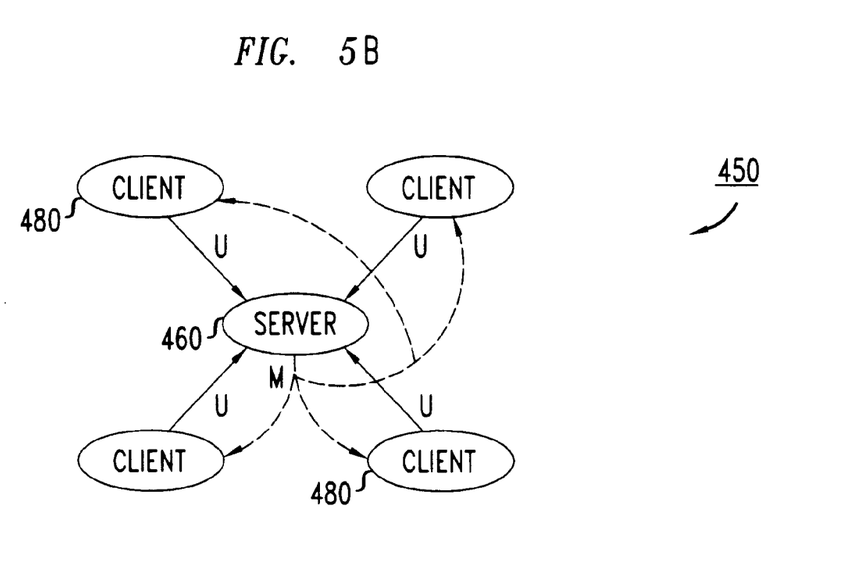

Referring now to FIG. 5(b), it can be seen in another exemplary multi-spoke configuration 450, that if the number of spokes is large at a hub, it may be more efficient for a server 460 to multicast the retransmission to all the client units 480, instead of dealing with unicast replies. Recall that the sever unit 460 can send retransmissions out to a unicast address. This would work particularly well if all the spokes experience roughly the same loss behavior. However, this is not always the case, and therefore there is the added disadvantage that during any interval the most lossy spoke would generate retransmission traffic on all the spokes. There are, however, more sophisticated ways of dealing with this situation as explained below.

The effectiveness of the present system client-server architecture in repairing incoming packet streams by retransmissions, is determined by the choice of the design parameters specified above, some of which may have to be adjusted dynamically as the network conditions change. The effect of altering three of these key parameters in terms of the performance of the system is discussed below. A single client-server pair as in FIG. 1 is used for these measurements.

Figure 6:
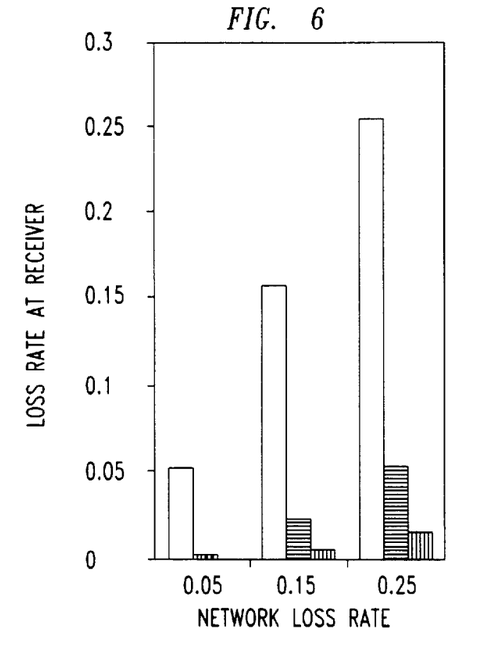
FIG. 6 is a graph which demonstrates the effect of retransmission requests at the receiver.

FIG. 6 shows the effect that the maximum number of retransmit requests made by the client unit for a lost packet (retry_limit) had on the effective loss rate seen by the receiving applications. This represents the fraction of the original transmission that could not be repaired. Since the loss rate on the network needed to be controlled for simulation purposes, it was performed on the Bell Labs Network Emulator, a hardware testbed for real time emulation of network architectures and operating conditions. An on-off burst model is assumed for the losses, with a geometric distribution within each loss or packet burst; the same loss rate is assumed present in both directions. A mean burst loss of three packets is used for this simulation; however the burst loss length does not seem to have a noticeable effect on the effective reception rate at the receivers after repair. The mean burst loss rate has a significant effect on the original audio or video quality though, and in that sense on the subjective improvement in quality. The key point to note is that the effective loss rate does drop almost exponentially with the number of retransmission requests, therefore very few (fewer than three) requests need be made for an acceptable reception rate (better than 95%).

While it is the case that the improvement in reception rate is determined almost entirely by the maximum number of retransmit requests, there are other factors that affect how efficiently this improvement is brought about. Chief among these factors is the spacing between consecutive requests for a lost packet, e.g., how long a client unit waits for a retransmit copy to arrive before making an additional request. One measure of efficiency is the fraction of retransmit requests that are wasteful, e.g., requests whose responses have to be discarded because of a previous retransmitted copy reached the client unit after this request was generated. Recall that the threshold used to general another request is T×avg_rt, where avg_rt is the moving average of the last K round-trip delays and T is a multiple. (k=15 by default.) Note that this threshold varies dynamically with the network conditions.

Figure 7:
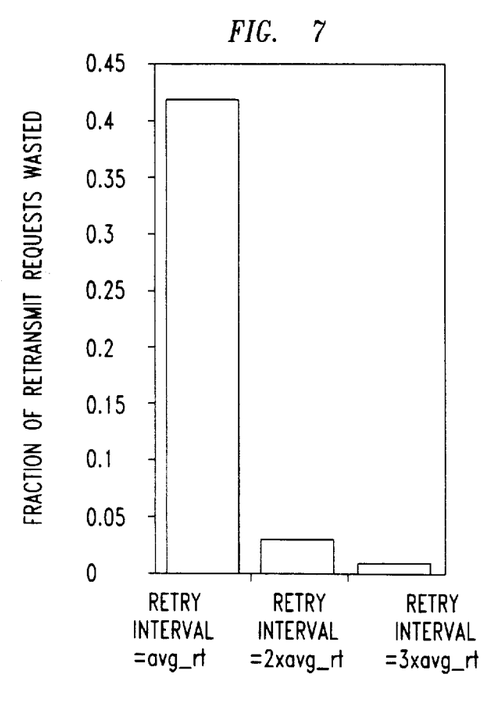
FIG. 7 is a graph which demonstrates the effect of various spacings of retransmission requests.

FIG. 7 shows the effect that this threshold had on the fraction of requests that are wasted. This figure is obtained from an actual multicast test session between Indian Hill and Murray on the corporate Intranet The test session had the following characteristics: Loss rate=12%, Mean round trip delay=77 ms, and Standard deviation of round trip delays= 30 ms. As can be clearly seen, the longer a client unit waits before sending out another request for a missing packet, the greater are the chances that the response to a previous request is not on its way. FIG. 7 also shows that a threshold of one round trip delay is undesirable because of the variation in packet delays. Waiting for two round trip delays reduces the wasteful request to about 3% and for three round trip delays, to about 1%. Recall from the previous discussion that the mean buffer size will be around (max(retry_count)+ 1)×T×avg_rt/(mean inter-packet time). The disadvantage of waiting too long is that the buffer size and the playback delay will grow correspondingly. The default value for this parameter in the present system is 2×avg_rt. For conversational transmissions such as in video phone applications, the system takes an absolute bound on this delay as an input parameter.

Figure 8:
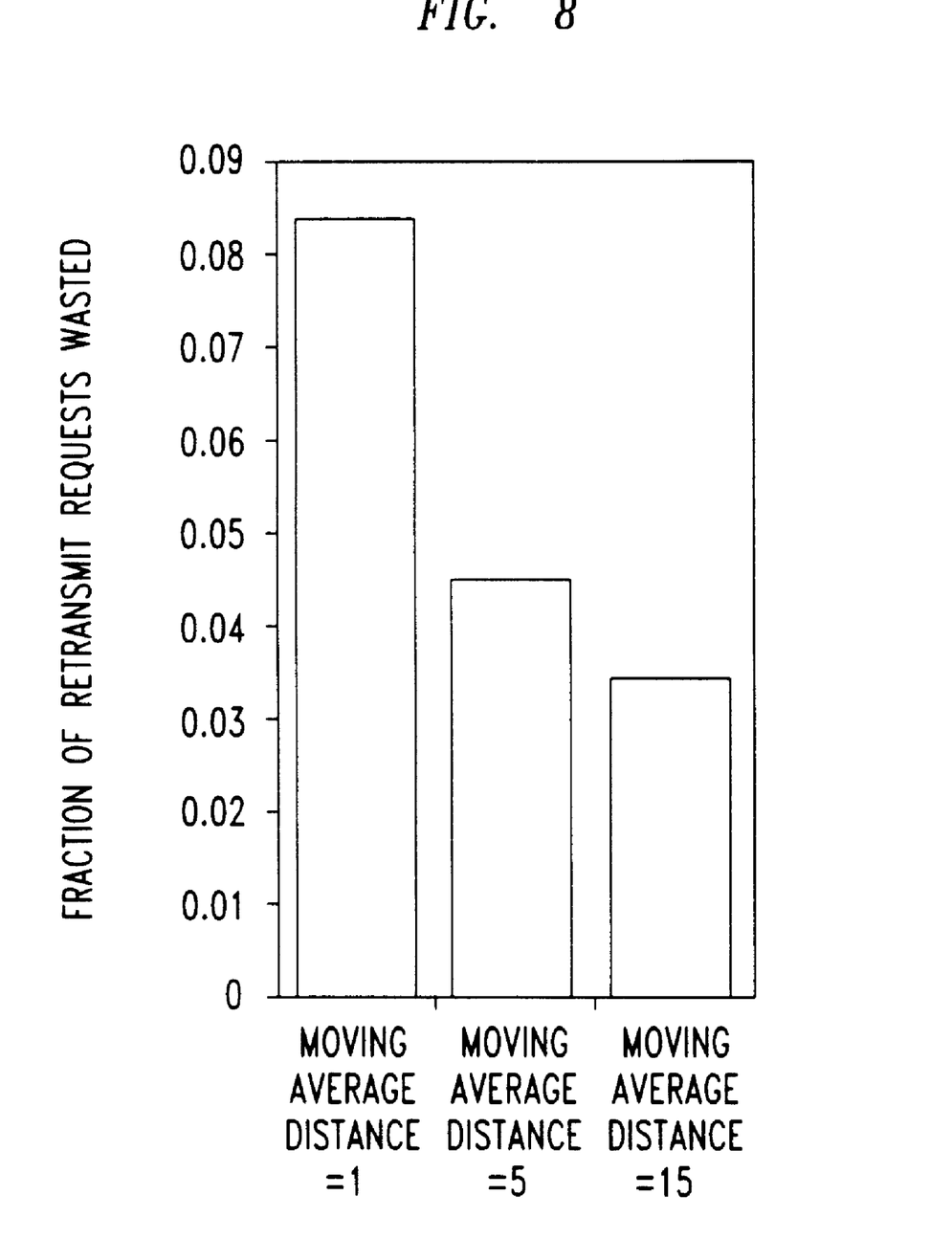
FIG. 8 is a graph which demonstrates the effect of various moving average distances.

A second parameter in the dynamic threshold used to determine spacing between multiple retransmission requests is the number of previous retransmissions over which the moving average of the round trip delays (avg_rt) is computed. FIG. 8 shows the effect that different moving average distances had on the fraction of retransmission requests that are wasteful. The threshold is 2×avg_rt. This data was obtained from the same test session as discussed above. The graph illustrates that because of the tremendous variation in packet delays, it is desirable to smooth the avg_rt out by averaging over the last 10–15 packets. While it is desirable to use a longer moving average distance for a higher rate transmission, there does not seem to be an advantage in smoothing over a very large interval. The default value in the system for this parameter is the last 15 round trip delays between the client unit and the server unit.

A unique characteristic of the present invention system is that it can be implemented on the current Internet without modifying the other receivers and transmitters that take part in the multicast session. Receivers that receive transmissions from these client units would see a much lower effective loss rate than those that listen directly to the source. A set of client and server units can be placed and connected together in a multitude of configurations to improve applications ranging from distributive video programming to point to point video telephony. The present invention is especially useful for corporate Intranet environments, where picture and sound quality is of prime concern, and to Internet Service Providers, who can use the system to provide superior service to their subscribers.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

APPENDIX A

```
input_process
  receive_copy
    {
    insert_packet (vid_req_table{in_seqno].buffer_loc);
    if (vid_request_table[in_seqno].retry_count == in_retry_count)
       update avg_
    rt;
    }
  receive_orig
    {
    while (curr_seqno < i < in_seqno)
      {
      playback_buffer[boq].valid_tag = 0;
      playback_buffer[boq].pkt_type = in_type;
      playback_buffer[boq].seqno = i;
      playback_buffer[boq].pkt_delay =
         curr_time - prev_input_time/loss_cnt+1);
      playback_buffer[boq].last_req_time = curr_time;
      boq++;
      generate retransmission request with
      type=in_type, retry_count=1 and seqno=i;
      }
    playback_buffer[boq].pkt_type = in_type;
    playback_buffer[boq].seqno = in_seqno;
    playback_buffer[boq].pkt_delay =
       (curr_time - prev_input_time/loss_cnt+1);
    insert_packet[boq]; boq++;
    curr_seqno - in_seqno;
    }
insert_packet(buf_loc)
    {
    playback_buffer[buf_loc].valid_tag = 1;
    playback_buffer[buf_loc].pkt_length = in_length;
    playback_buffer[buf_loc].payload = in_packet;
    }
```

APPENDIX B

```
Output Process
retry_request
    {
    if ((playback_buffer[hole_loc].retry_count < retry_limit) &&
        (curr_time-playback_buffer[hole_loc].last_req_time)>T*avg_rt))
        {
        playback_buffer[hole_loc].last_req_time = curr_time;
        playback_buffer[hole_loc].retry_count++;
        generate a retransmission request with
        type=playback_buffer[hole_loc].pkt_type,
        retry_count=playback_buffer[hole_loc].retry_count, and
        seqno=playback_buffer[hole_loc].seqno;
        }
    }
output_packet
    {
    if (playback_buffer[toq].valid_tag = 1)
       {
       output packet to appropriate port based on
          playback_buffer[toq].pkt_type;
       playback_buffer[toq].valid_taq = 0;
       playback_buffer[toq].retry = 0;
       toq++
       }
    else
       if (playback_buffer[toq].retry_count>retry_limit)
          {
          *_req_table[playback_buffer[toq].seqno].valid=0;
          playback_buffer[toq].retry = 0;
          toq++;
          }
    }
```

What is claimed:

1. A data packet retransmission arrangement comprising:

at least one client unit associated with at least one destination;

a source of data packets, said source transmitting the data packets to said at least one client unit using a real-time transport protocol, said data packets representing real-time audio or video, said client unit operable for receiving said data packets on behalf of said at least one destination; and at least one server unit operable to receive a copy of each said data packet that said source transmits to said client unit;

said client unit being further operable, responsive to a received packet being indicative of an error, for sending to said server, rather than to said source, a request to retransmit that one of the data packets that said server received from said source that will correct said error;

wherein said at least one client unit and said at least one server unit operate independently of said source and said at least one destination.

2. The arrangement according to claim 1, wherein said client unit includes:

a detector for determining if an incoming data packet is in a proper sequence;

a playback buffer for storing each said incoming data packet in a time order; and means for generating said request to retransmit to said server unit if said incoming data packet is out of sequence.

3. The arrangement according to claim 2, wherein said detector calculates an inter-packet delay if said incoming data packet is out of sequence and inserts each said out of sequence incoming data packet in said playback buffer to form a repaired packet stream.

4. The arrangement according to claim 3, wherein a repaired packet stream is sent from said playback buffer to said at least one destination in said time order.

5. The arrangement according to claim 1, wherein said client unit sends out at least another request to retransmit after a given interval.

6. The arrangement according to claim 5, wherein said given interval is a multiple of an average round trip time between said client unit and said server unit.

7. The arrangement according to claim 1, wherein said server unit responds to said request to retransmit by retransmitting a lost data packet to said client unit.

8. The arrangement according to claim 7, wherein said request to retransmit includes a sequence number, a retransmission request number and a requesting client unit number.

9. The arrangement according to claim 7, wherein said server unit includes a retransmit buffer for storing a given number of data packets.

10. The arrangement according to claim 1, wherein said data packets are sent using a real time transport protocol, further wherein:

said client unit is operable to determine if an incoming data packet is out of sequence and is further operable to generate said request to retransmit for a lost data packet if said incoming data packet is out of sequence;

said server unit being responsive to said request by sending said copy of said lost data packet to said client unit; and said client unit being further operable to send said lost data packet in a time order to said destination.

11. A method for retransmitting data packets, said method comprising the steps of:

transmitting data packets from a source to at least one client and to at least one server using a real-time transport protocol, said data packets representing real-time audio or video, said client unit associated with at least one destination and operable for receiving said data packets on behalf of said at least one destination; and responding to a received packet being indicative of an error, by having said client request retransmission of said data packets from said server, rather than said source, that will correct said error;

wherein said at least one client and said at least one server operate independently of said source and said at least one destination.

12. The method according to claim 11, wherein said step of responding includes the step of correcting said error in said client unit by forming a repaired packet stream.

13. The method according to claim 11, wherein said step of responding further includes the steps of:

determining if an incoming data packet is in a proper sequence;

buffering a given set of said data packets in said client unit in a given time order in response to whether said incoming data packet is out of sequence;

generating a retransmission request with a set of identification parameters if said incoming data packet is out of sequence and is a lost data packet;

transporting a copy of said lost data packet from said server unit to said client unit; and inserting said copy of said lost data packet in said time order to form a repaired packet stream.

14. The method according to claim 11, wherein said step of responding includes the step of sending another retransmission request after waiting a given duration for a copy of a lost data packet from said server unit.

15. The method according to claim 11, further including the step of generating at least one lost data packet indicator corresponding to each said error.

16. An apparatus for retransmitting data packets, said apparatus comprising:

a playback register associated with at least one destination;

a source of data packets, said source transmitting the data packets to said playback register using a real-time transport protocol, said data packets representing real-time audio or video, said playback register operable for receiving said data packets on behalf of said at least one destination; and a retransmit register for receiving a copy of each said data packets that said source transmits to said playback register;

said playback register being further operable, responsive to a received packet indicative of an error, for sending to said retransmit buffer, rather than to said source, a request to retransmit that one of the data packets that said retransmit register received from said source that will correct said error;

wherein said playback register and said retransmit register operate independently of said source and said at least one destination.

17. The apparatus according to claim 16, wherein:

said playback register is operable to determine an out of sequence incoming packet and hold a given set of packets;

said retransmit register is operable to send a copy of a lost data packet to said playback register; and said playback register is further operable to insert said copy of said lost data packet from said retransmit register into said set of packets in a time order to form a repaired packet stream.

18. The apparatus according to claim 16, wherein said data packets are sent over a real time transport protocol and said playback register uses said protocol format to place a set of identifying information regarding a lost packet.

19. The apparatus of claim 16, wherein said playback register is a circular register and has an active region.

20. The apparatus of claim 16, wherein said playback register maintains a time order of said data packets and transmits said data packets at a given inter-packet interval.

21. A system for transmission of packet streams between at least one source and at least one receiver using a real-time transport protocol, said data packets representing real-time audio or video, said system comprising:

at least one server unit being operable to receive a packet stream from said source; and at least one client unit being operable to detect an error in said packet stream from said source and request retransmission of a lost packet from said server, rather than from said source;

said client unit being further operable to send a repaired packet stream to said receiver, said repaired packet stream including said lost packet;

wherein said at least one client unit and said at least one server unit operate independently of said source and said receiver.

22. The system according to claim 21, wherein:

said client unit being further operable to determine if a packet is out of sequence; and said client unit being further operable to store said packet and mark an intermediate set of packets as lost if said packet is out of sequence.

23. The system according to claim 21, wherein:

said client unit being operable to insert a retransmitted lost packet in a time order to form said repaired packet stream; and said client unit being further operable to send said repaired packet stream in said time order to said receiver.

24. The system according to claim 21, wherein:

said server unit being further operable to store M number of packets, each said packet having a sequence number; and said server unit being further operable to retrieve said packet by locating said packet by said sequence number modulo M.

25. The system according to claim 24, wherein said M is a power of 2.

* * * * *